United States Patent [19]

Namba et al.

[11] Patent Number: 5,719,558
[45] Date of Patent: Feb. 17, 1998

[54] MONITORING APPARATUS FOR A POWER PLANT COMPRISING DIRECT CURRENT SOURCES

[75] Inventors: Shigeaki Namba; Katsuyoshi Takizawa, both of Hitachi, Japan

[73] Assignee: Hitachi, Ltd., Tokyo, Japan

[21] Appl. No.: 589,471

[22] Filed: Jan. 22, 1996

[30] Foreign Application Priority Data

Jan. 30, 1995 [JP] Japan .................... 7-012296

[51] Int. Cl.$^6$ .................... G08B 21/00
[52] U.S. Cl. .................... 340/660; 340/664; 340/525; 340/500; 345/35; 345/40; 345/904
[58] Field of Search .................... 340/660, 664, 340/635, 643, 525, 500, 501, 636; 354/88, 468; 136/290; 345/35, 24, 40, 30, 904, 206

[56] References Cited

U.S. PATENT DOCUMENTS

| | | | |
|---|---|---|---|
| 4,189,725 | 2/1980 | Rowland | 340/636 |
| 4,311,993 | 1/1982 | Strobel | 340/641 |
| 5,241,482 | 8/1993 | Iida et al. | 364/468 |
| 5,241,657 | 8/1993 | Fine et al. | 395/162 |
| 5,254,996 | 10/1993 | Claar et al. | 340/636 |
| 5,553,209 | 9/1996 | Johnson et al. | 395/133 |

FOREIGN PATENT DOCUMENTS 2-273042  11/1990  Japan .
3-145943   6/1991  Japan .

*Primary Examiner*—Jeffery Hofsass
*Assistant Examiner*—Davetta Woods
*Attorney, Agent, or Firm*—Fay, Sharpe, Beall, Fagan, Minnich & McKee

[57] ABSTRACT

A monitoring apparatus for a power plant including a plurality of direct current sources, includes a unit for displaying a predetermined number of symbols representing the direct current sources, and a unit for changing a displayed form of a corresponding symbol when at least one physical quantity of the states of the direct current sources changes.

18 Claims, 10 Drawing Sheets

FIG. 2
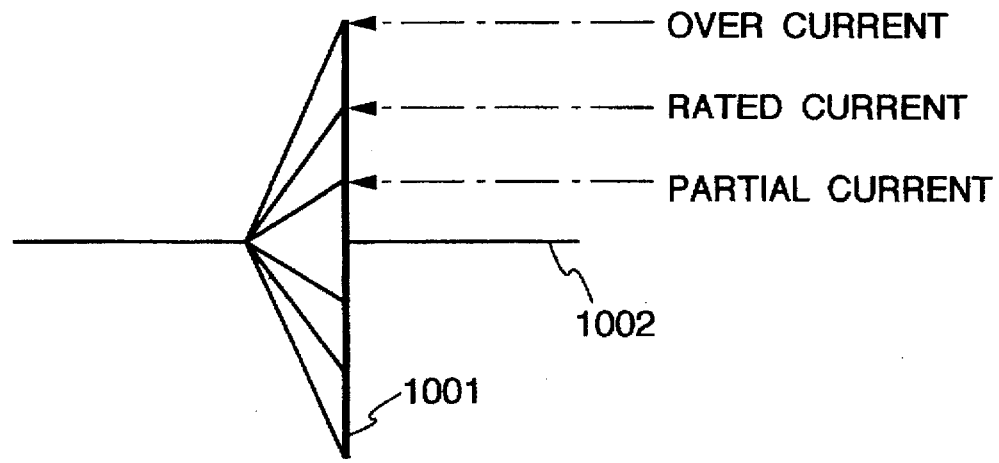
- OVER CURRENT
- RATED CURRENT
- PARTIAL CURRENT
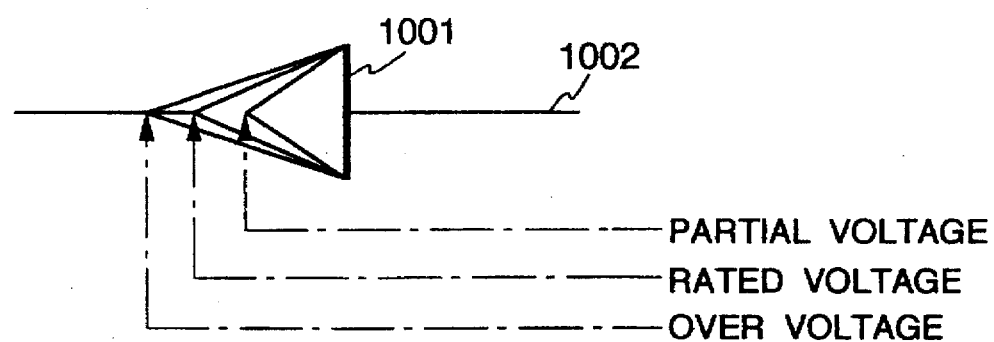
- PARTIAL VOLTAGE
- RATED VOLTAGE
- OVER VOLTAGE
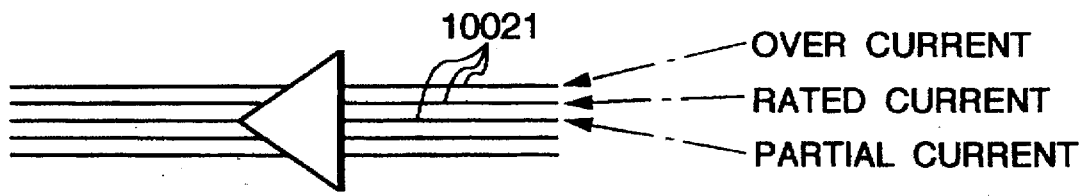
- OVER CURRENT
- RATED CURRENT
- PARTIAL CURRENT
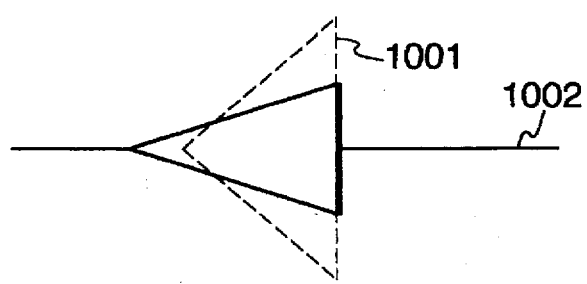

FIG. 11

| NO. | COMPONENT NAME | OPERATION STATES |
|---|---|---|
| 1 | ① ○ VALVE | CLOSING → OPENING |
| 2 | ② ◇ PUMP | STOPPING → STARTING |
| 3 | ③ □ VALVE | CLOSING → OPENING |
| 4 | ⑤ C VALVE | CLOSING → OPENING |
| 5 | ⑧ C TANK | LEVEL HIGH |
| 6 | ⑤ C VALVE | OPENING → CLOSING |
| 7 | ② ◇ PUMP | STARTING → STOPPING |
| 8 | ③ □ VALVE | OPENING → CLOSING |
| 9 | ① ○ VALVE | OPENING → CLOSING |

| NO. | COMPONENT NAME | OPERATION STATES |
|---|---|---|

102

| NO. | COMPONENT NAME | OPERATION STATES |
|---|---|---|
| 123 | ⑯ ◇ VALVE | OPENING → CLOSING |
| 124 | ⑱ □ VALVE | OPENING → CLOSING |
| 125 | ⑲ ☆ VALVE | CLOSING → OPENING |
| 126 | ⑮ ◎ PUMP | STARTING → STOPPING |

| NO. | COMPONENT NAME | OPERATION STATES |
|---|---|---|
| 123 | ⑯ ◇ VALVE | OPENING → CLOSING |
| 124 | ⑱ □ VALVE | OPENING → CLOSING |
| 125 | ⑲ ☆ VALVE | CLOSING → OPENING |
| 126 | ⑮ ◎ PUMP | STARTING → STOPPING |

150

SYSTEM DIAGRAM

160

MONITORING APPARATUS FOR A POWER PLANT COMPRISING DIRECT CURRENT SOURCES

BACKGROUND OF THE INVENTION

1. Field of the Invention

The present invention relates to a monitoring apparatus for a power plant composed of a plurality of direct current sources (also referred to as direct current generating units), for example, fuel cells, for generating electric power, and especially to a monitoring apparatus for a power plant including direct current sources, which displays the operation status of direct current sources by using a display device such as a CRT.

2. Description of the Related Art

In a recent conventional operation state monitoring system for a plant, a system diagram of a plant is displayed on a monitoring screen, which classifies the operation states of plant components (also referred to as auxiliary machines) by color familiar to operators and, for an operation state monitoring of an electric power line system, the same display method is used. For example, in the method disclosed in Japanese Patent Application Laid-Open No. 273042/1990, for displaying power transmission state, the direction and magnitude of the load-flow in an electric power line or transformers shown by a single-line diagram are displayed by dividing the electric power line into small intervals and coloring or flickering each of the intervals. And, in the display method disclosed in Japanese Patent Application Laid-Open No. 145943/1991, each power source line that generates a voltage is displayed by a different color.

However, with the above-mentioned conventional techniques, an adequate monitoring display method has not been devised for monitoring a power plant including a plurality of direct current sources such as fuel cells. Also, an effective monitoring method or apparatus for such a power plant has not been realized partially because such existing plants are few.

Furthermore, it is necessary to grasp the operation states of each generating unit, in order to monitor the states of a power plant including a plurality of the direct current generating units such as fuel cells. However, it is difficult to grasp the operation states of each one of the direct current generating units at a glance by displaying many generating units with a predetermined symbol on a screen, since such a power plant includes a considerable number of direct current generating units and all the generating units have the same function. Therefore, the more direct current generating units there are, the more difficult it is to grasp instantly the operation states of each one.

SUMMARY OF THE INVENTION

Objects of the Invention

The present invention has been developed with consideration of the above described problems, and aims at providing a monitoring apparatus, by using a display screen on which the operation states of many direct current generating units can be individually and easily grasped by operators.

And the present invention further aims at providing a plant monitoring apparatus enabling operators easily to grasp the manipulating states of auxiliary machines by displaying the manipulated contents (or procedures) and states of the auxiliary machines on the display screen.

Methods Solving the Problem

In order to attain the above-mentioned objects of the present invention, a monitoring apparatus for a power plant including a plurality of direct current sources comprises means for displaying a predetermined number of symbols representing the direct current sources, and means for changing a displayed form of a corresponding symbol when at least one physical quantity of the states of one of the direct current sources changes.

In the above monitoring apparatus, it is also available that each of the symbols is formed so as to indicate the polarity of each of the direct current sources.

Further, in the above monitoring apparatus, it is also available that, when the first physical quantity of the states of one of the direct current sources changes, a displayed form of a corresponding symbol is changed in a predetermined direction, and when the second physical quantity changes, a displayed form of a corresponding symbol is changed in a direction different from the former direction.

Further, in the above monitoring apparatus, it is also available that, when a voltage of one of the direct current sources changes, a displayed form of a corresponding symbol is changed in a predetermined direction, and when a current of one of the direct current source changes, a displayed form of a corresponding symbol is changed in a direction different from the former direction.

Further, in the above monitoring apparatus, it is also available that each one of the direct current sources is displayed by a symbol having a form indicating the polarity of the source, and a displayed form of a corresponding symbol is changed in the direction of the polarity when at least one of a voltage or a current of one of the direct current units changes.

Further, in the above monitoring apparatus, it is also available that each one of the direct current sources is displayed by a symbol having a form indicating the polarity of the source. Then, when a voltage of one of the direct current sources changes, a displayed form of a corresponding symbol is changed in the direction of the polarity, and when a current of one of the direct current sources changes, a displayed form of a corresponding symbol is changed in the direction different from the former direction indicating the polarity.

Then, each of the above-mentioned means to attain the object of the present invention changes the displayed form of a symbol itself representing each one of the direct current sources. Further, for a power plant including a plurality of generating systems, each of which is composed of a definite number of direct current sources electrically connected to each other, a system diagram composed of the definite number of the symbols representing the direct current sources and line symbols representing the electrical connections between the direct current sources in the generating system is displayed. Then, in displaying the system diagram, it is also available to change the displayed form of a corresponding symbol of the direct current source or a corresponding line symbol, when at least one physical quantity of the states of one of the direct current sources in one of the generating systems changes.

Further, in the monitoring apparatus, it is also available that, when at least one physical quantity of the states of the direct current sources or the generating systems changes, a displayed form of a corresponding line symbol is changed, and when another physical quantity changes, a displayed form of a corresponding symbol of the direct current source is changed.

Further, in the monitoring apparatus, it is also available that, when a current of the generating systems changes, a displayed form of a corresponding line symbol is changed, and when a voltage of the direct current sources changes, a displayed form of a corresponding symbol of the direct current source is changed.

Further, in the monitoring apparatus, it is also available that, when a current of the generating systems changes, the width of a corresponding line symbol is changed, and when a voltage of the direct current sources changes, a displayed form of a corresponding symbol of the source is changed in the direction of connection of the line symbols.

Further, in the monitoring apparatus, it is also available that a symbol of each direct current source is formed so as to indicate the polarity of the direct current source, a line symbol of each generating system is formed so as to connect the symbols of the sources, the width of the corresponding line symbol is changed when a current of one of the generating systems changes, and a displayed form of the corresponding symbol of the direct current source is changed in the direction of connection of the line symbols when a voltage of one of the direct current sources changes.

Further, in the monitoring apparatus, it is also available that, at the vicinity of each symbol of a direct current source, information on the operation status or the operation history of the direct current source corresponding to the above symbol is displayed, especially one of the lifetime consumption and the remaining lifetime.

Further, the present invention provides a monitoring apparatus for a power plant including a plurality of generating systems, each of which is composed of a definite number of direct current sources electrically connected to each other, comprising means for displaying a system diagram composed of a definite number of the symbols representing the direct current sources and line symbols representing the electrical connections between the direct current sources in the generating system on a display screen, the means further including means for displaying at least a part of a prepared picture showing a plurality of generating systems and changing a displayed picture to a picture including another generating system by scrolling the display screen on demand.

Then, the feature of the present invention to attain another object is to provide a plant monitoring apparatus having means for displaying a systems diagram of a plant, being composed of predetermined symbols formed for a plurality of plant components, wherein a figure of information on predetermined manipulating procedures of components for the plurality of plant components is displayed on the same screen as the system diagram is displayed, and the manner of display of the figure displaying the information on the component manipulation contents is changed according to the states of manipulation or operation of the plant components.

Then, the plant component to be manipulated is displayed so as to be distinguished from the other operation states.

By using the monitoring apparatus for a power plant including direct current sources to attain the object of the present invention, since the predetermined number of symbols representing the direct current sources are displayed and the displayed forms of the symbols representing the direct current sources are changed corresponding to physical quantities (for example, voltage, current, etc. of the direct current sources) indicating the states of the direct current sources, the states of the direct current sources, which are changing every moment, can be expressed by the displayed forms of the symbols themselves. Therefore, the state of each one of the many direct current sources having the same function can be visually grasped on the display screen, since the displayed form of each one of the many symbols is presented differently from the displayed forms of other symbols, corresponding to the operation states of the direct current source which the symbol represents.

And, since each different physical quantity of the direct current source (for example, voltage, current, etc. of the direct current source) is allocated to one of the change directions of the displayed form of the symbol, and the changes of the different physical quantities appear as the different changes in the displayed form of the symbol, the different physical quantities can be simultaneously and easily grasped.

Further, a system diagram composed of the predetermined number of the symbols representing the direct current sources and the line symbols representing the connections between the direct current sources is displayed, and the displayed forms of the corresponding symbols or the line symbols are changed corresponding to the changes in the physical quantities of the direct current sources or the generating systems. Therefore, since the physical state changes in the generating systems appear as changes in the displayed forms of the symbols in the displayed system diagram, the physical state changes of the generating systems, such as a current change of the generating systems or a voltage change of the direct current sources, can be visually grasped.

By using the monitoring apparatus for a power plant including direct current sources to attain another object of the present invention, since a figure of information on predetermined manipulating procedures of components for the plurality of plant components is displayed on the same screen as the system diagram is displayed, and the manner of display of the figure displaying the information on the manipulation is changed according to the states of manipulating or operation of the plant components, the manipulating situation of the individual plant components and the progress situation of the manipulation procedures of the plant components can be easily grasped.

BRIEF DESCRIPTION OF THE DRAWINGS

FIG. 2 shows examples according to a displayed form change of a symbol representing a direct current generating unit, of embodiment of the present invention.

FIG. 8($b$) shows an example configuration of a figure in which the voltage of each direct current generating unit is displayed by the three dimensional expression by using the coordinate system shown in FIG. 8(a).

FIG. 11 shows an example figure in which the manner of display of the component manipulation procedures is changed corresponding to the operation states of the direct current generating units.

FIG. 12 is an enlarged figure of a part of the table of component manipulation procedures.

FIG. 13 is a figure for explaining an embodiment in which the component manipulation procedures are displayed by scrolling a monitoring screen.

DETAILED DESCRIPTION OF THE EMBODIMENTS

Figure 1:
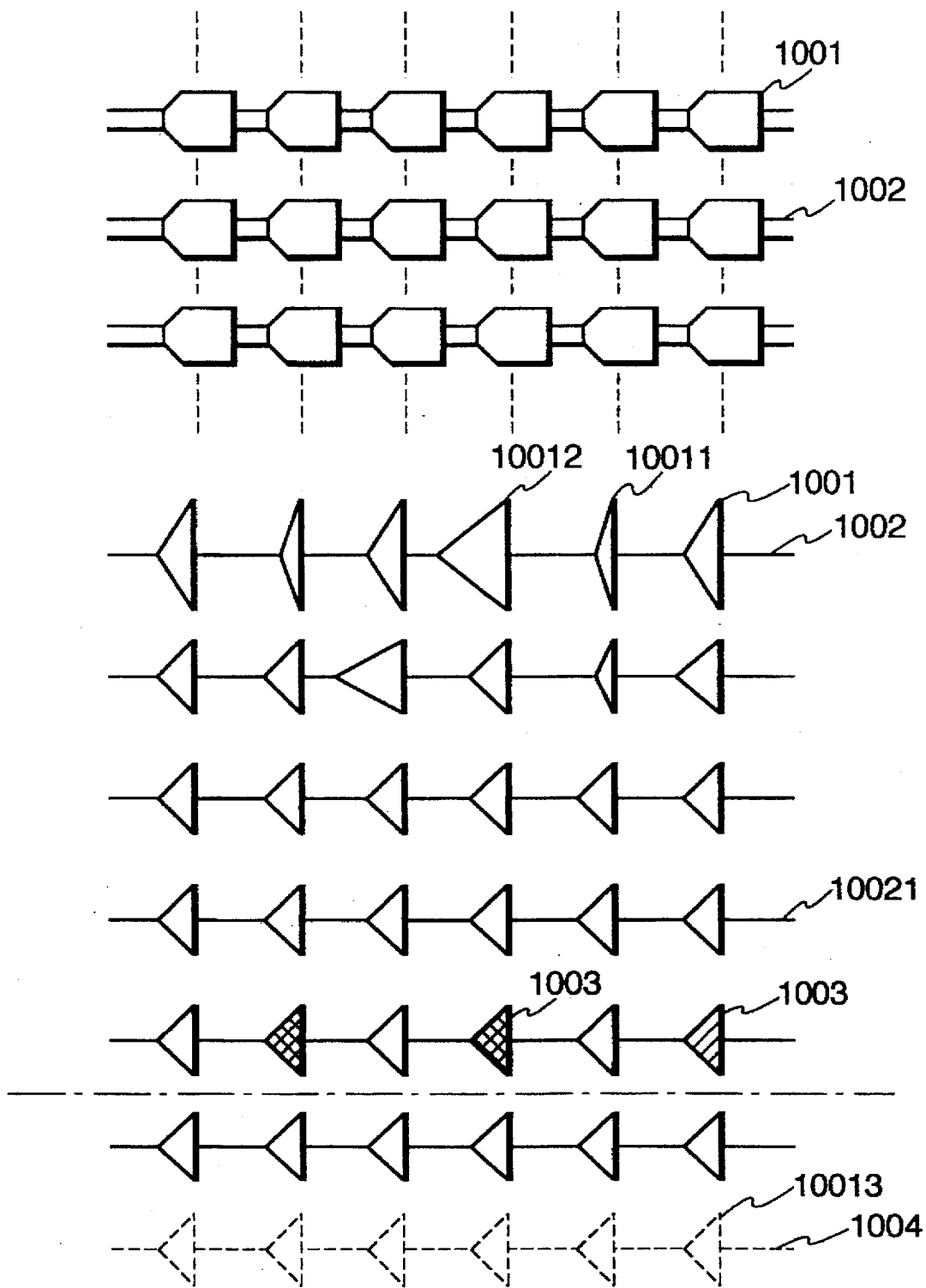
FIG. 1 shows an example configuration of a displayed figure for monitoring groups of direct current generating units, according to an embodiment of the present invention.

Hereinafter, details of the present invention are explained based on embodiments, referring to the drawings.

FIG. 1 shows an example configuration of a displayed figure for monitoring groups of direct current generating units 1000, according to an embodiment of the present invention.

In the figure, for a group of six symbols connected in a series, each of them representing a direct current generating unit, several examples of display patterns are shown together, and the left and right sides of the figure indicate the positive and negative polarity of the direct current generating unit, respectively. In the figure, as symbol patterns displayed in the monitoring screen, the display pattern composed of hexagon symbols is shown in the upper part of the figure, and the one composed of triangles in the middle part of the figure. In the pattern composed of hexagons, vertical dashed auxiliary lines are displayed for easily recognizing the positions of the hexagons. Then, as examples displayed by triangle symbols shown in the bottom region under a one-dot chain line, the two display patterns of two generating systems of the serially connected direct current generating units are shown by solid lines and dashed lines, respectively, and an operating system and a stopping system 1004, 10013 by solid lines and dashed lines, respectively. In the following, each of the display patterns is explained.

AS to the groups of the direct current generating units shown by the hexagonal symbols 1001 and the line symbols 1002 connecting the hexagonal symbols, since the widths and the heights of all the hexagons are equal, it means that the current and the voltage of all the generating units in the groups are the same. In this case, it is also possible that the current level can be expressed by the width of each line symbol 1002 besides the size of each hexagonal symbol 1001.

In the pattern composed of the triangle symbols, the sizes of the triangles are differently displayed. The height in the vertical direction of each triangle corresponds to the current level, and the width in the horizontal direction of each triangle corresponds to the voltage level. By the above-mentioned display, the output voltage level of each one of the direct current generating units, a plurality of them being serially connected and composing a generating system, can be grasped at a glance. The difference of the current level between a generating system and the neighboring generating system or another generating system can be also grasped at a glance. That is, it is visually and easily grasped that the generating system having a large height of symbols is a generating system through which a large current flows. Further, in a generating system, the differences of the shared voltages among the generating units can be intuitively grasped. That is, since the width of the symbol 10011 is smaller than the width of the symbol 1001, the voltage level of the generating unit 10011 is lower, which means that the performance of the generating unit 10011 is not so good. And, since the width of the symbol 10012 is larger than the width of the symbol 1001, the generating unit 10012 outputs a high level of voltage, indicating a good performance. Further, the width of the line symbol 10021 corresponds to the current level. Further, the displayed forms of the symbol 1003 are examples for distinguishing the different voltage levels by brightness or color.

Figure 15:
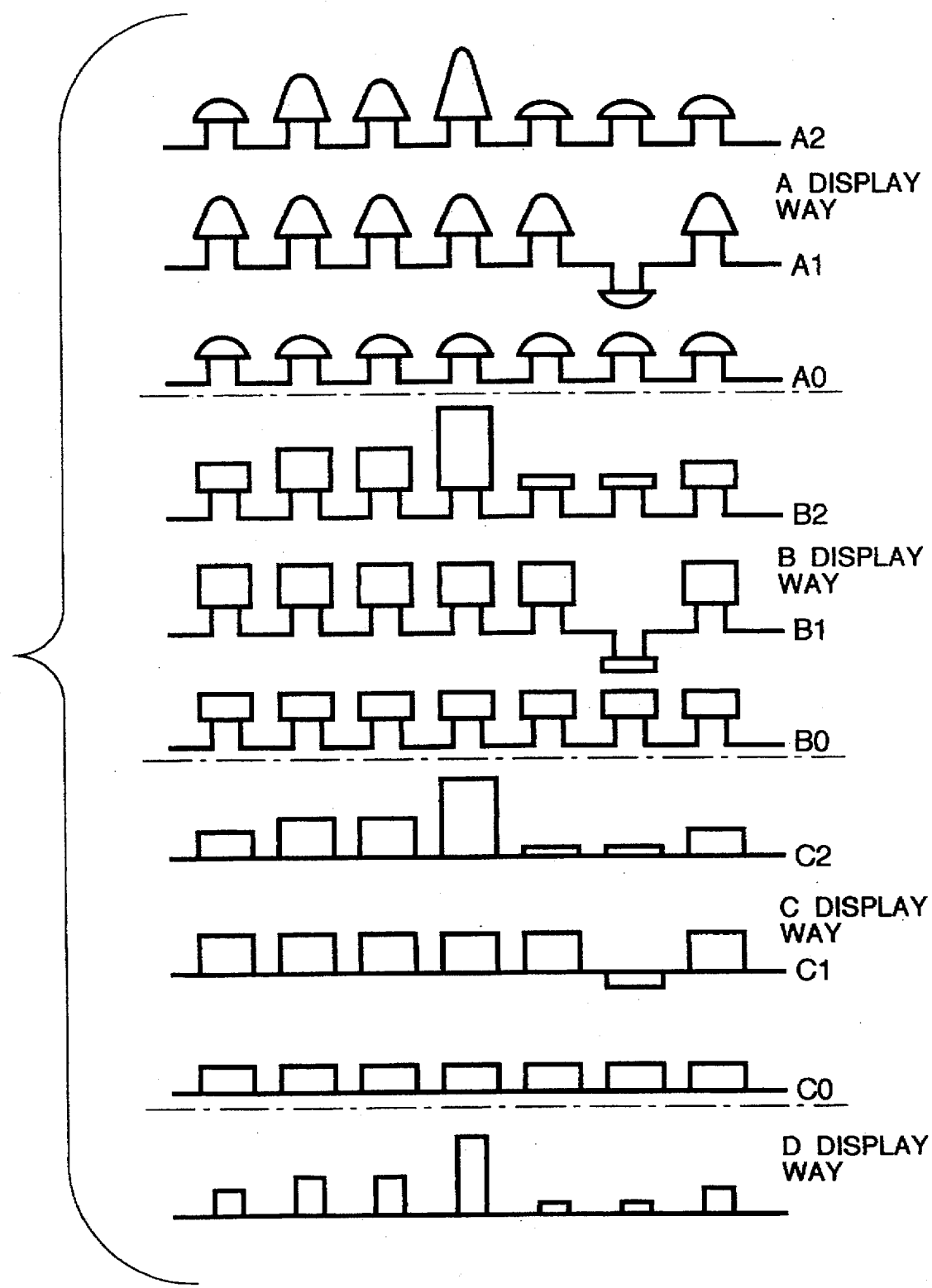
FIG. 15 is a figure in which symbols different from the symbol shown in FIG. 1 are used for representing the direct current generating unit.

Although the polarity of the symbols is the same in FIG. 1, it is necessary to take into account that some generating units may show the inverse polarity due to the property of a generating unit. That is, even if the direction of a generating unit is the same as the ones of the other generating units, it occasionally indicates the inverse polarity due to its inferiority or erroneous connection. Especially, in dealing with many generating systems having many generating units, such erroneous connections of the generating units or systems possibly occur. In FIG. 15, other display symbol patterns are shown. In display A shown by FIG. 15, the height direction of each symbol is perpendicular to the connective direction of the symbols and expresses the voltage level or the power level. In setting the display pattern shown by the A0 series in FIG. 15 as the fundamental pattern, an inversely directed symbol in the A1 series corresponds to a generating unit indicating the inverse polarity.

The symbols of the A2 series have the different heights, which means that the generating units operate at different performance levels. Further, except that the display B uses a symbol shape different from the one in display A, the display B is the same as display A. Display C omits the display of connections between the generating units and displays only the performance of each generating unit by a bar graph. Further, display D is based on display C and displays the current level by using the bar graph, the width of each one of which corresponds to the current level of the corresponding generating unit.

FIG. 2 is a figure for explaining the embodiment wherein the symbol 1001 representing each generating unit is a triangle,. and the displayed form of the symbol is changed corresponding to the current and voltage levels. In the first figure shown in FIG. 2, in which the line symbol 1002 is a symmetric axis line, the length of a base 1001 of the triangle is longer for an over current and shorter for a partial current, compared with the rated current, corresponding to the present load current. The manner of display shown by the first figure in FIG. 2 is not restricted to the above-mentioned three kinds of displays, but made include almost continuous changes in the length of the base. In the second display shown in FIG. 2, the manner of display of the voltage level of each generating unit is shown, and in the third display shown in FIG. 3, the current level is not displayed by changing the form of the symbol representing each generating unit, but by changing the width of the line symbols representing the lines for connecting the generating units, since the current level is equal at any place in the generating system. In the fourth display figure in FIG. 2, the current and voltage levels are simultaneously displayed by changing the displayed form of the symbol representing each generating unit.

In the following, it is described how to display the changes of the symbols. Although the data update period is not the same for the data of current and the data of voltage since the current and the voltage are measured by different detectors, respectively, the data for the shorter update period are updated by its period and the data value for the longer update period are kept during the longer period. There are at least two points indicating the current level and the voltage level of each generating unit. In FIG. 2, two of the points correspond to the two apices of a triangle. The third point is a point on the base and on the line 1002 opposite the other apex of the triangle. In regarding the point of the base intersecting the line symbol 1002 of the triangle as the original point, the coordinates (b 0,Y) and (X,0) in the orthogonal coordinate system correspond to the point indicating the current level and the point indicating the voltage level, respectively. For displaying the triangle, the operations of connecting the point (X,0) with the point (0,Y), and the point (0,Y) with the original point, are executed. Then, another half of the triangle is displayed by such an operation as optically making the symmetrical image of the former half of the triangle. The connection of the points of the triangle is executed by such an operation as generating the light emission of the luminous elements on or at the vicinity of the line between the above-mentioned points.

Figure 3:
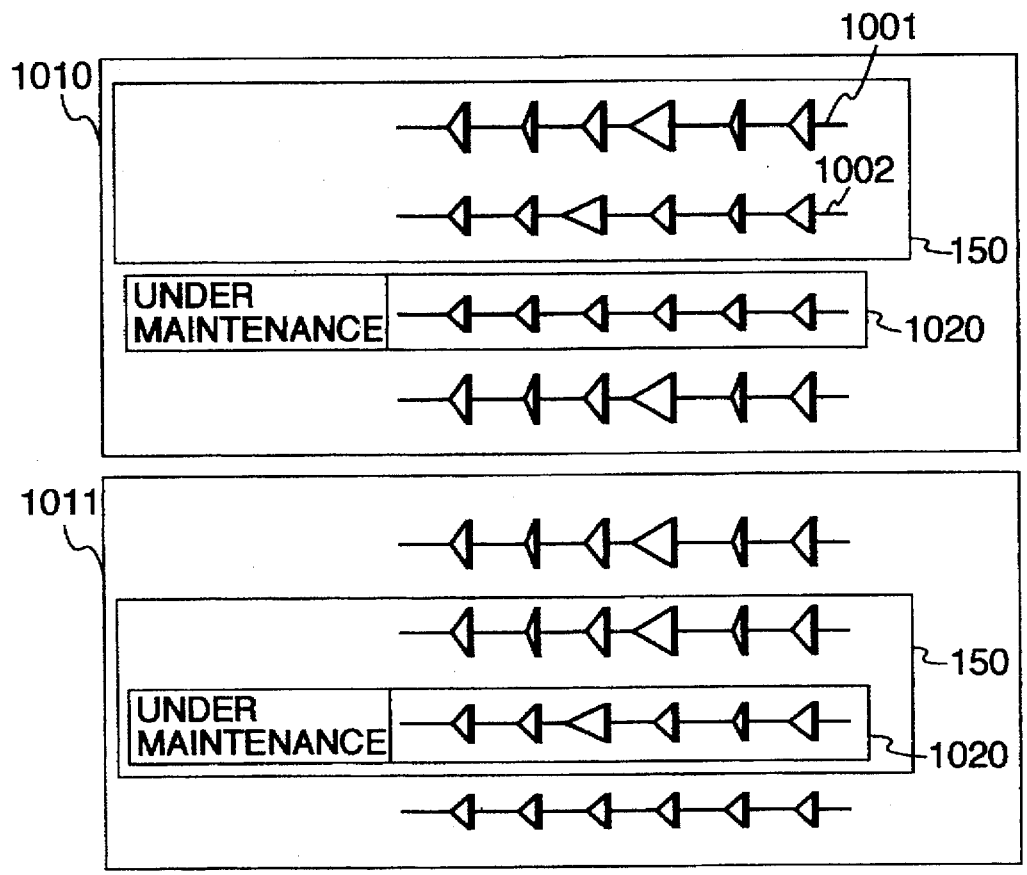
FIG. 3 is a figure for explaining an embodiment of scrolling a monitoring screen for displaying groups of the direct current generating units.
Figure 4:
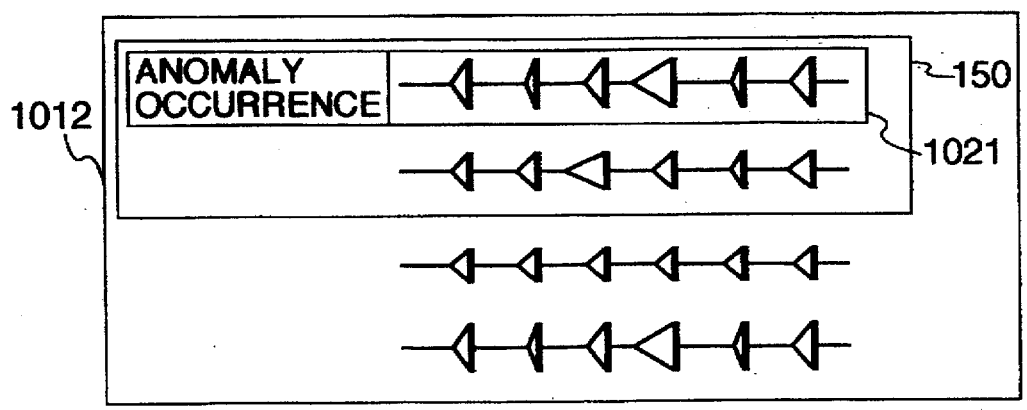
FIG. 4 is an example of a displayed figure when a system malfunction is occurring.

By referring to FIG. 3, the screen scrolling and the highlighting of a specific generating system according to an embodiment of the invention are explained. In monitoring the whole groups of the direct current generating units, it probably occurs that, if very many generating units are displayed on a CRT, each displayed symbol becomes too small to be recognized. For such a case, the function of scrolling a screen is provided in the embodiment. That is, in the groups of the generating units 1010, for a displayed region corresponding to a displayed FIG. 150, for example, only the two generating systems of the whole systems are displayed. Then, the whole units can be totally monitored by manually or automatically scrolling the screen in the upper or lower direction. By the above-mentioned means, the problem in the visual grasp of the displayed figure to an operator can be solved. Then, in case there is a generating system under maintenance, the attention of an operator is aroused by changing the background color of the generating system or highlighting it. Further, by the screen scrolling function, in the case of ANN (annunciation)for informing an anomaly occurrence in a generating system, the counteractions to the anomaly are supported by changing the presently displayed figure to a figure for displaying the problem generating system by an interrupt function. That is, in FIG. 3, in the screen 150 of the upper FIG. 1010, the generating system 1020 under maintenance, in which the anomaly is occurring is not included, and then, in the screen 150 of the lower FIG. 1011, the problem generating system 1020 is displayed after a definite time. Further, as an example display of another anomalous generating system, a group of the generating systems including the anomalous system 1021 is automatically displayed by the interrupt function, as shown by FIG. 4.

Figure 5:
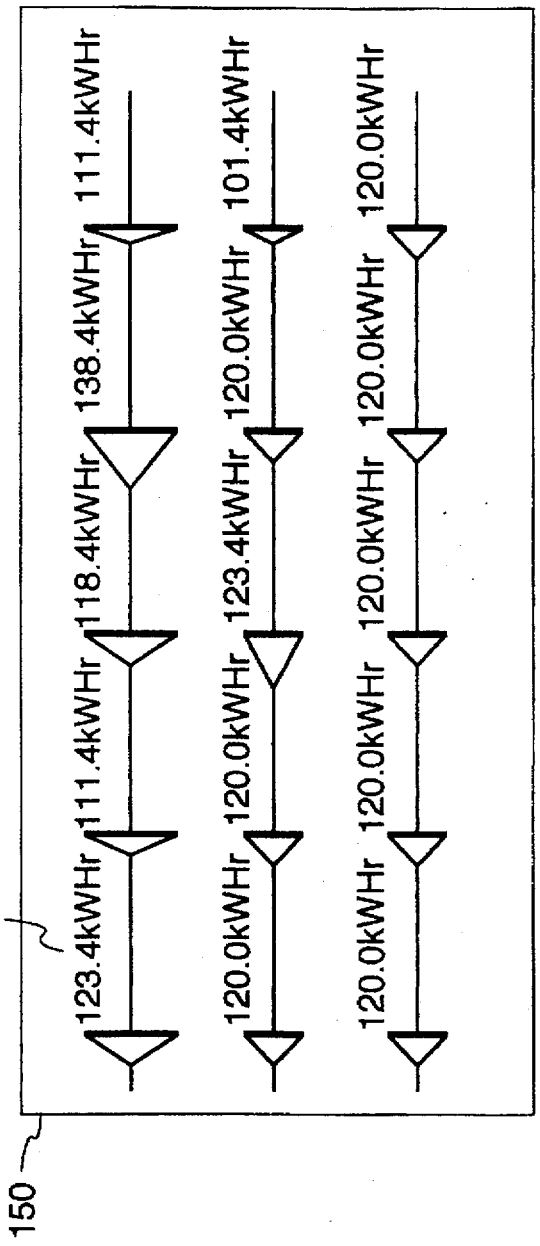
FIG. 5 shows an example figure in which operational management parameters are displayed at the vicinity of each one of the symbols representing the direct current generating units.

Then, by referring to FIG. 5, an embodiment is explained wherein not instantaneous measured values but operation management parameters are displayed at the vicinity of a symbol representing each unit in the displayed group of the direct current generating units. In the example shown by FIG. 5, the operation power of each unit is displayed, and it is also available to display the operational parameters such as the number of start-up and stop operations, the number of heat cycles, the number of over pressure shocks and so forth. That is, it is understood enough, for example, that the lifetime consumption of a unit due to long time operations affects the present performance degradation of the unit, by displaying additionally the information on the operation history of the unit.

Figure 6:
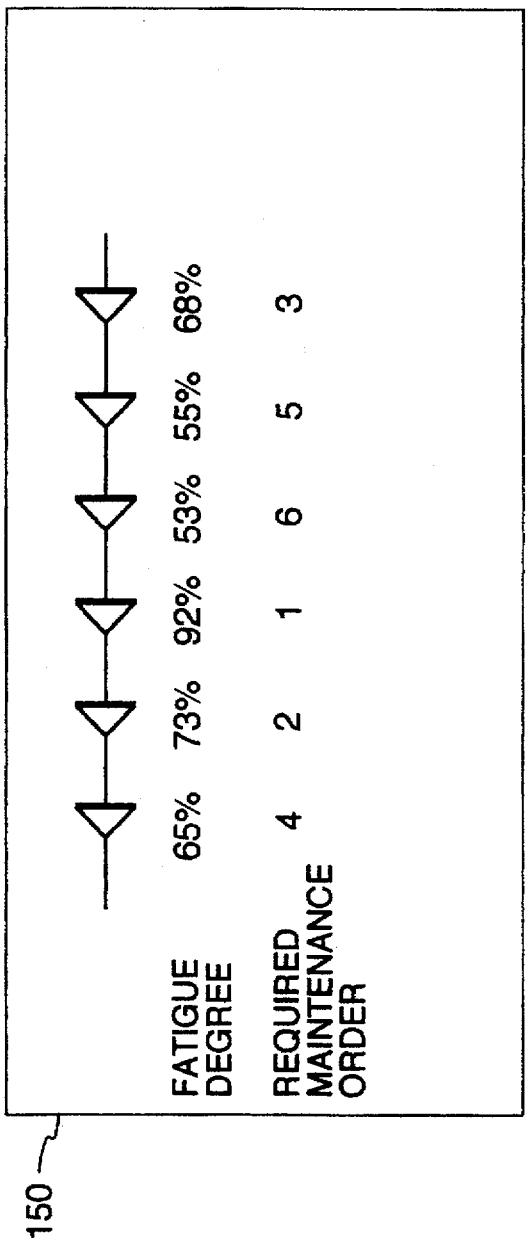
FIG. 6 shows an example figure in which operation history parameters and the number of the required maintenance order are displayed at the vicinity of each one of the symbols representing the direct current generating units.

Further in FIG. 6, is shown an example display on which the maintenance requiring order of each unit is displayed. The above-mentioned display is available to such a maintenance way in which the unit of larger life consumption or longer accumulation time of operation, namely, of higher fatigue degree, is earlier maintained than the ones of lower fatigue degree. Further, since such a display is carried out for the whole generating systems including many generating units, the display is useful to an operator's obtaining the information on deciding the maintenance timing of the generating units or to a maintenance worker's determining the maintenance planning at the field of the units.

Figure 7:
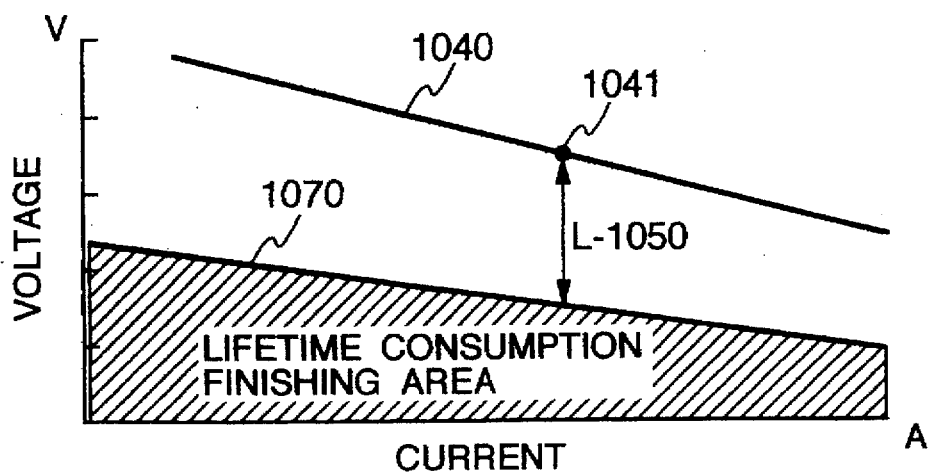
FIG. 7 is a figure for explaining the estimation of the lifetime consumption of a direct current generating unit.

FIG. 7 shows the margin to the lifetime finishing for the present operation point for estimating the performance of each unit. The static performance curve of the present generating unit is expressed by the curve 1040, and the performance is now estimated at the operation point 1041. Then, a lifetime consumption finishing area expressed by a shaded trapezoid is shown in the lower part of FIG. 7, and if the performance of a generating unit enters the area, or does not come out of the area during the predetermined time after entering the area, it is determined that the unit is to be exchanged. And, the margin to the lifetime consumption finishing is expressed as the vertical distance from the operation point 1041 to the lifetime consumption finishing area. Then, L-1050 shown in FIG. 7 is a parameter for expressing the margin. A generating unit indicating the inverse polarity is dealt with by the same manner as the unit of which the performance enters the lifetime consumption finishing area.

Figure 8A:
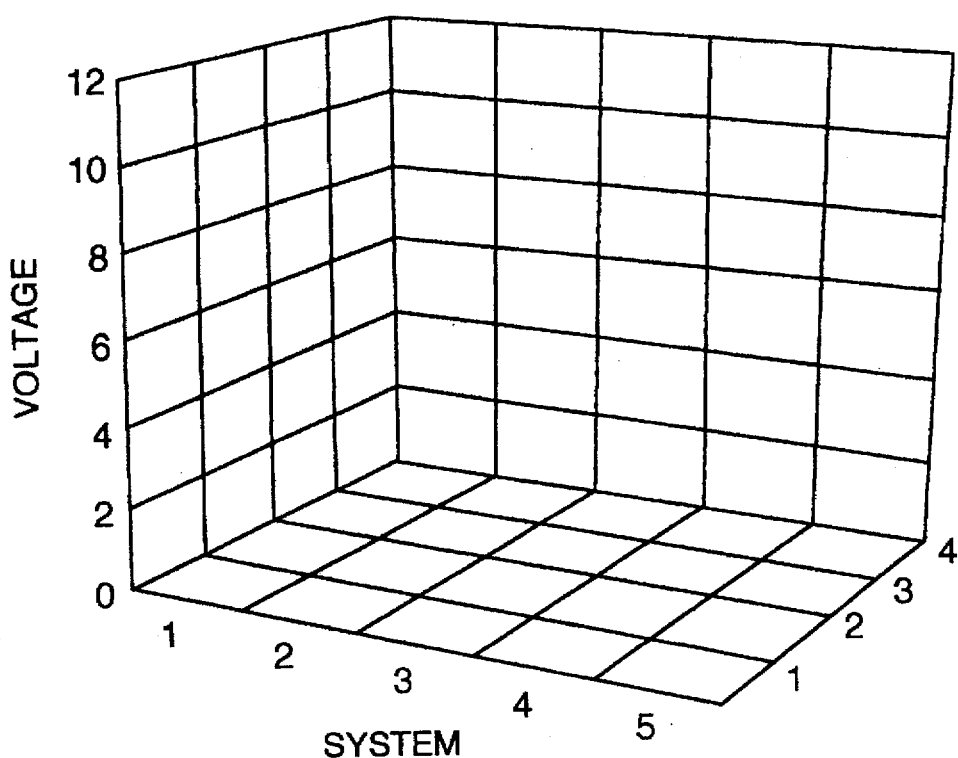
FIG. 8($a$) shows the coordinate system for a three dimensional expression of voltage of each direct current generating unit for each generating system.
Figure 8B:
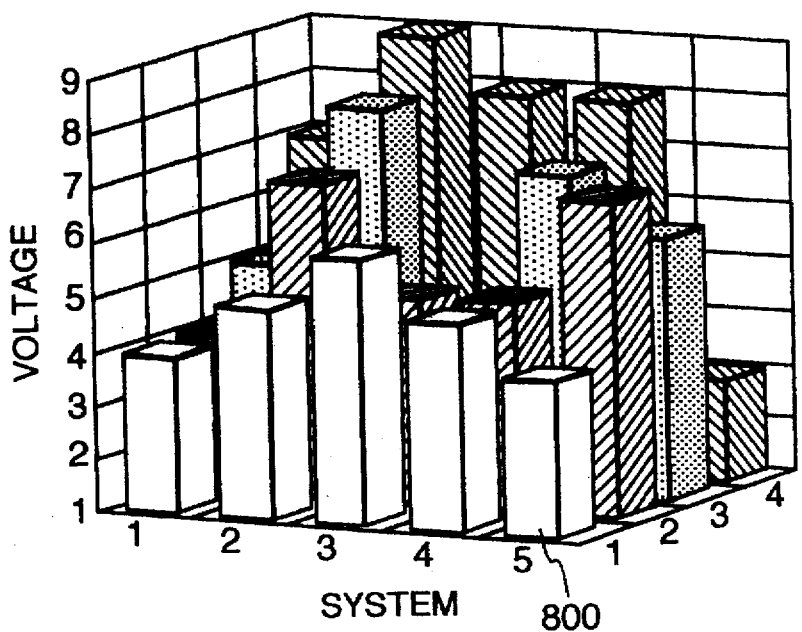

The following explains about a three-dimensional display shown in FIGS. 8(a) and 8(b). In the above explanation, the display method displays the two-dimensional information as changes of the symbols on a screen plane. On the other hand, in FIG. 8(b), the information is three-dimensionally displayed as a bird's eye view on the screen plane. That is, the location of each one of the many direct current generating units is allocated to each one of the subareas of a diamond shape in the coordinate system for the bird's eye view display shown by FIG. 8(a). The parameter for monitoring the operation states of each unit, for example, the voltage each generating unit is allocated to the virtual third axis of FIG. 8(b). Then, if the current information is required to be added on the figure shown by FIG. 8(b), it can be expressed by the thickness of each pillar 800 indicating the voltage value.

Figure 9:
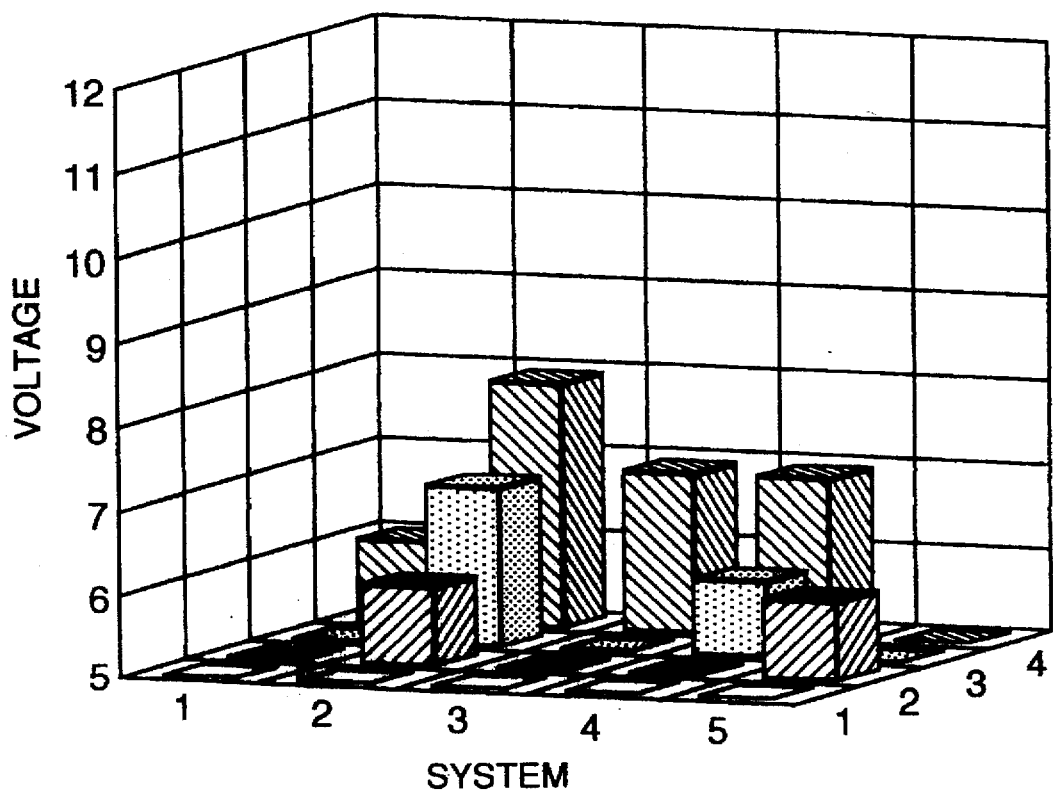
FIG. 9 shows another example configuration of the figure shown by FIG. 8(b).

FIG. 9 is an example figure provided for displaying the pillars hidden by the pillars of this side and not displayed in the figure shown by FIG. 8(b). That is, some of the pillars projecting from a standard plane set by an operator are displayed. In FIG. 9, the standard plane is a horizontal plane defined by a voltage of 5, and the figure is useful to grasp intuitively how many units having the performance over a specified level exist although some pillars hidden by the pillars of this side are not displayed. And, if the figure is cut by a plane vertical to the base plane used for locating the display position of each unit, the hidden pillars can be displayed and appear in this side. Further, displaying the figure as shown by FIG. 9 by continuously moving the horizontal standard plane in the vertical direction makes it easy to understand the performance distribution of all units.

In the following is explained an embodiment of an apparatus for monitoring a direct current generating system including the groups of the direct current generating units, by using a display method different from the hitherto-explained method. This monitoring apparatus displays a simplified figure configuration for an operator since displaying the operation states of the many groups of the many generating units gives an operator a heavy load of monitoring. In the present monitoring apparatus, the normal units are not displayed or the displays of the normal units are masked, as occasions need.

Figure 10:
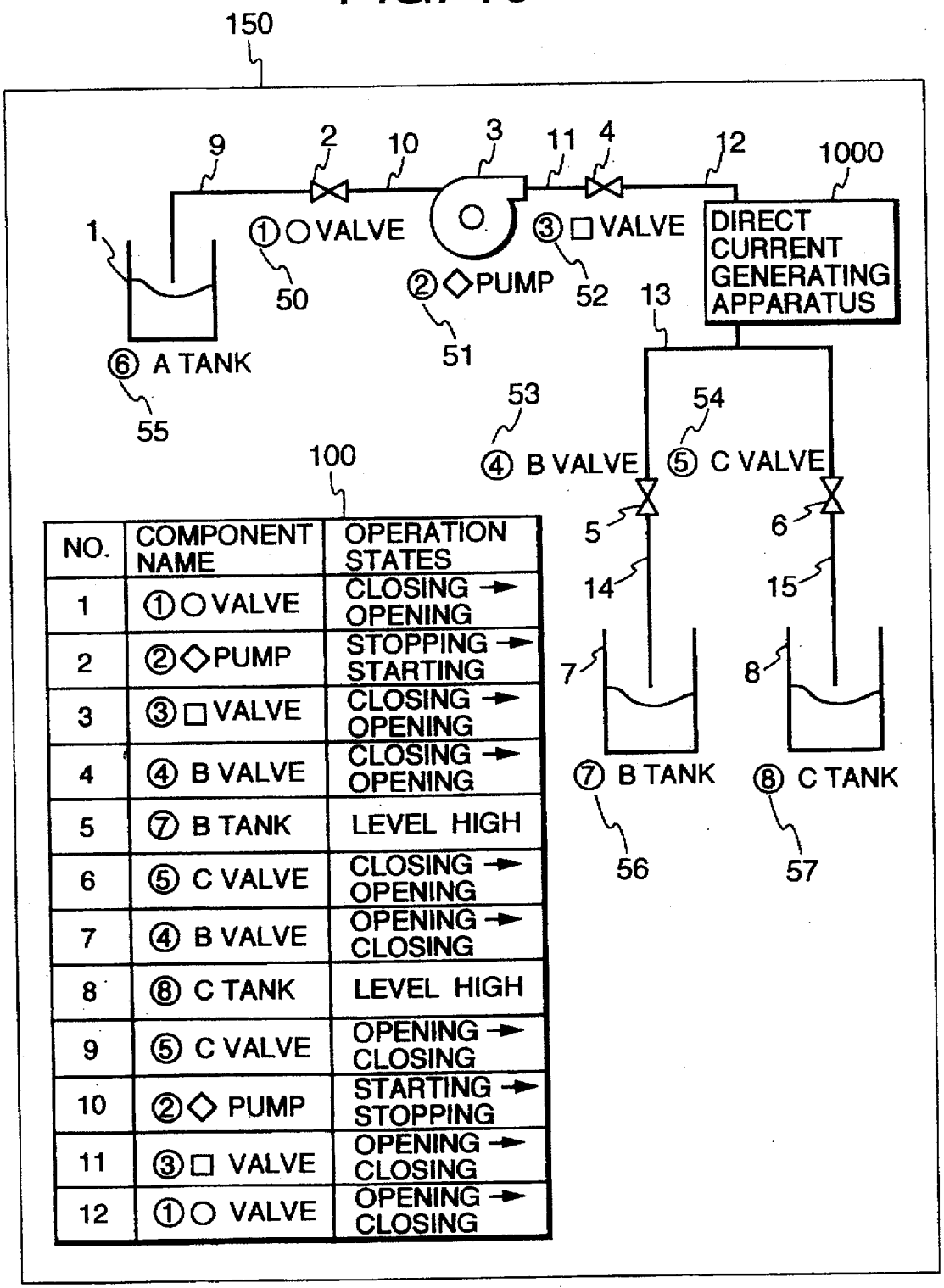
FIG. 10 shows an example configuration of a figure in which a system diagram of a direct current generating plant and a table of component manipulation procedures are displayed on the same screen.

FIG. 10 shows an example figure configuration of the embodiment, in a system diagram of which the numeral 150 indicates a displayed figure, the numerals 1, 7 and 8 indicate tanks for storing liquid, the numerals 2 and 4–6 indicate valves, the numerals 3 indicate a pump, the numerals 9–10 indicate pipes connecting the valves, the pump and the tanks, the numerals 50–57 indicate the names of auxiliary components and the auxiliary component numbers on system diagrams, and the numeral 100 indicate a table in which operation procedures of the direct current generating system are displayed. Then, the numeral 1000 indicates the whole groups of the direct current generating units.

In the system shown by FIG. 10, the liquid is transported from the A tank I by the pump 3, and processed and consumed in the whole groups of the direct current generating units 1000. Then, after the predetermined amount of the liquid is transported to the B tank 7, the predetermined amount of the liquid is transported to the C tank 8. The manipulation procedures of the auxiliary components are composed of the steps of the first step of opening the o valve 2, the second step of starting the ◊ pump 3, the third step of opening the □ valve 4, the fourth step of opening the B valve 5, the fifth step of confirming, by the level high signal, that the predetermined amount of the liquid has been transferred to the B tank 7, the sixth step of opening the C valve 6, the seventh step of closing the B valve 5, the eighth step of confirming, by the level high signal, that the predetermined amount of the liquid has been transferred to the C tank 8, the ninth step of closing the C valve 6, the tenth step of stopping the ◊ pump 3, the eleventh step of closing the □ valve 4 and the twelfth step of closing the o valve 2.

At first, the monitoring FIG. 150 is displayed for starting the system shown by FIG. 10. Then, the line of the manipulation step No. 1 to be executed is expressly indicated by displaying only the line of No. 1 by a color different from the color of the other lines or by flickering the line, or by displaying an arrow at the right or left side of the line. Further, it is also available to flicker the o valve 2 or display a frame enclosing the o valve 2, in the system diagram of the displayed figure 150. After finishing the manipulation for changing the closing state to the opening state of the o valve 2, the color of the line is changed to a different color, for example, the color used before the manipulation of the valve, or the flickering of the line is stopped. Then, for example, the line of the manipulation step No. 2 is flickered, or an arrow is displayed at the right or left side of the next line. In the case of flickering the line of the manipulation step No. 2, or displaying an arrow at the right or left side of the line, the color of the line of the step No. 1 is changed to a color different from the original color and the color of other unexecuted step lines. The color of the auxiliary components 2–6 which have been manipulated is changed, based not on the manipulation command signals, but on the operation state of each component. As mentioned above, the line of the manipulation or monitoring step to be executed, the line of the executed manipulation or monitoring step, and the line of the unexecuted manipulation or monitoring step, are distinctly indicated to an operator by using the combination of some of the coloring, the flickering, the marking, the lamp lighting and the underlining. If all the manipulation steps displayed on the figure are finished, the embodiment has the function of displaying the next figure on which another system and/or other component manipulation steps are indicated.

In case the B tank 7 is already filled up by the liquid, the manipulation steps No. 4, 5 and 7 in the table 100 shown by FIG. 10 are omitted, and the table of the manipulation step 101 shown by FIG. 11 is displayed in place of the table 100, on the monitoring screen. According to this embodiment, the monitoring figure is adequately displayed corresponding to the operation states of the object system.

In FIG. 12, the table 102 shows the component manipulation steps, and the table 103 is a zoomed part of the table 102. In FIG. 13, the table 104 shows the component manipulation steps, and the numeral 160 indicates a system diagram including the components displayed in the table 104. The numeral 150 indicates the monitoring figure displayed on the screen. In case there exist many component manipulation steps and items to be displayed by a table, a flow diagram or a sequential control logic diagram, sometimes, all the items cannot be displayed on one figure. Such a problem is solved by displaying only the part including the items before and after the item to be executed, by enlarging the part or scrolling the monitoring figure. Similarly, in case the whole system diagram cannot be displayed on one figure, the necessary part of the system diagram, corresponding to the component manipulation step executed by an operator, is displayed by scrolling the monitoring figure.

Further, it is also available that two figures neighboring each other are displayed on one screen. A table, a flow diagram or a sequential control logic diagram, in each of which the component manipulation steps are indicated, is displayed on one figure of the two, and the part of the system diagram corresponding to the manipulation steps to be displayed on the above-mentioned figure is displayed on the other figure.

Figure 14:
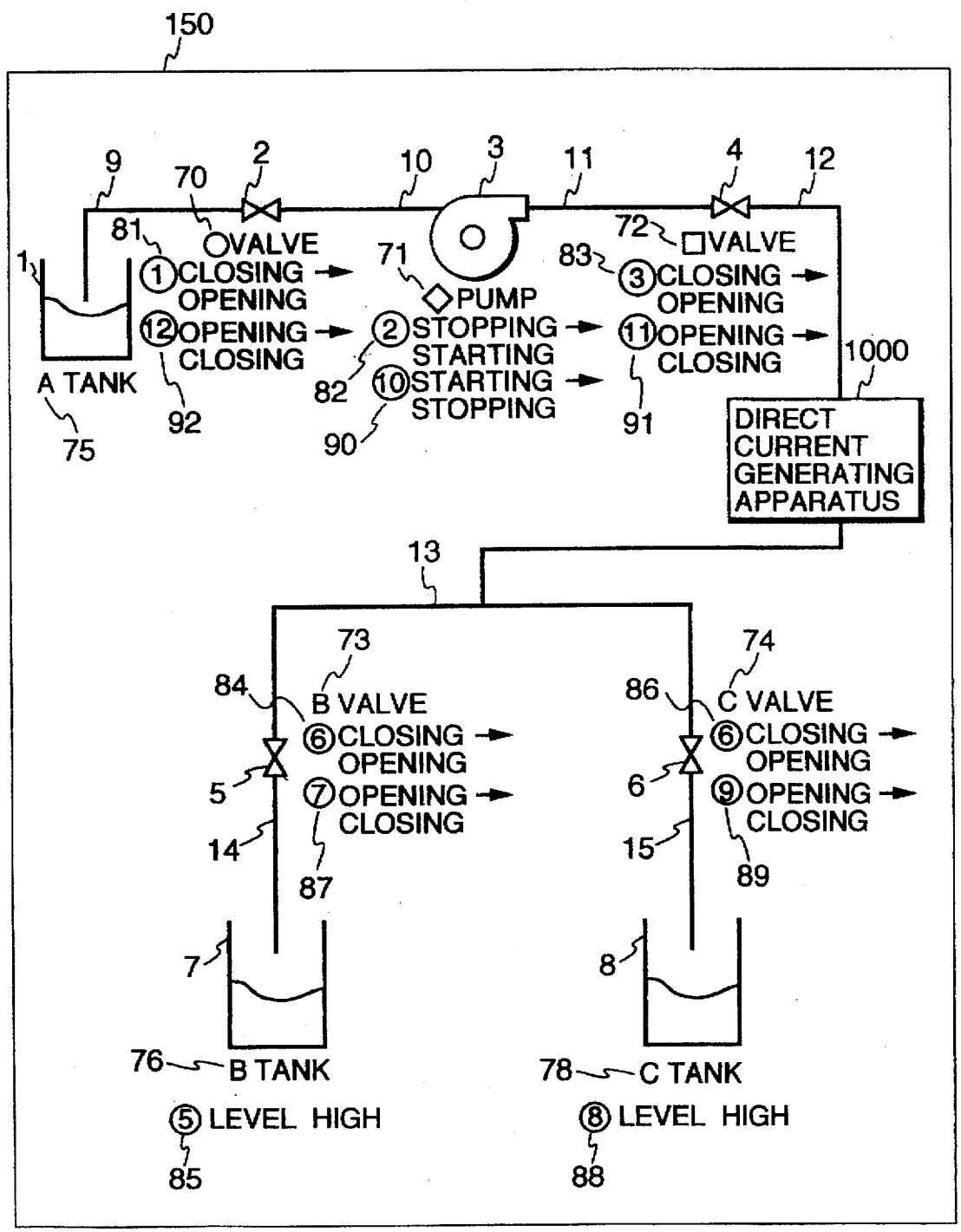
FIG. 14 shows another example configuration of a figure in which a system diagram of a direct current generating plant and a table of component manipulation procedures are displayed on the same screen.

In FIG. 14, the numerals 70–78 indicate a name, an abbreviated name or the component number of each auxiliary component, and the numerals 81–92 indicate the manipulation step number, the contents of the manipulation step or the monitoring items.

The monitoring figure 150 is displayed for starting the system shown in FIG. 14. Then, the manipulation step No. 1 to be executed is expressly indicated by displaying only the manipulation step 81 by a color different from the other manipulation steps 82–92 or by flickering the step, or by displaying an arrow at the right or left side of the step. Further, it is also available to flicker the o valve 2 or display a frame enclosing the o valve 2, in the system diagram of the displayed figure 150. After finishing the manipulation for changing the closing state to the opening state of the o valve 2, the color of the step is changed to a different color, for example, the color used before the manipulation of the valve, or the flickering of the step is stopped. Then, for example, the step 82 of the manipulation step No. 2 is flickered, or an arrow is displayed at the right or left side of the next step 82. In the case of flickering the step 82 of the manipulation step No. 2, or displaying an arrow at the right or left side of the step 82, the color of the line of the step No. 1 is changed to a color different from the original color and the color of other unexecuted steps.

As mentioned above, in the manipulation steps 81–92, the manipulation or monitoring step to be executed, the executed manipulation or monitoring step, and the unexecuted manipulation or monitoring step, are distinctly indicated to an operator by using the combination of some of the coloring, the flickering, the marking, the lamp lighting and the underlining. If all the manipulation steps displayed on the figure are finished, the embodiment has the function of displaying the next figure on which another system and/or other component manipulation steps are indicated.

In case a system diagram cannot be displayed on one figure, the necessary part of the system diagram, corresponding to the component manipulation step executed by an operator, is displayed by scrolling the monitoring figure.

By the present invention, the state of each one of the many direct current sources having the same function can be visually grasped on the display screen. And, since each one of different physical quantities of the direct current generating units (for example, voltage, current, etc. of the generating unit) is allocated to one of the change directions of the displayed form of the symbol, and the changes of the different physical quantities appear as the different changes in the displayed form of the symbol, the different physical quantities can be simultaneously and easily grasped.

Further, in the monitoring screen, a system diagram composed of the predetermined number of the symbols representing the direct current generating units and the line symbols representing the connections between the direct current generating units is displayed, the displayed forms of the corresponding symbols or the line symbols are changed corresponding to the changes of the physical quantities of the direct current generating units or the generating systems, and the physical state changes of the generating systems appear as the changes of the displayed forms of the symbols. Therefore, the physical state changes of the generating system, such as a current change of the generating systems, or a voltage change of the direct current sources, can be visually and easily grasped.

What is claimed is:

1. A monitoring apparatus for a power plant including a plurality of direct current sources, comprising:

means for displaying a predetermined number of symbols representing said direct current sources; and means for changing a displayed conformation of a corresponding symbol when at least one physical quantity of a state of at least one of said direct current sources changes.

2. A monitoring apparatus for a power plant including a plurality of direct current sources, comprising:

means for displaying a predetermined number of symbols representing said direct current sources, each one of said symbols also indicating the polarity of a corresponding one of said direct current sources; and means for changing a displayed conformation of a corresponding symbol when at least one physical quantity of a state of at least one of said direct current sources changes.

3. A monitoring apparatus for a power plant including a plurality of direct current sources, comprising:

means for displaying a predetermined number of symbols representing said direct current sources; and means for changing a displayed conformation of a corresponding symbol in a first predetermined direction when a first physical quantity of a state of at least one of said direct current sources changes, and for changing a displayed form of a corresponding symbol in a second predetermined direction different from said first predetermined direction when a second physical quantity of a state of at least one of said direct current sources changes.

4. A monitoring apparatus for a power plant including a plurality of direct current sources, comprising:

means for displaying a predetermined number of symbols representing said direct current sources; and means for changing a displayed conformation of a corresponding symbol in a first predetermined direction when a voltage of at least one of said direct current sources changes, and for changing a displayed form of a corresponding symbol in a second predetermined direction different from said first predetermined direction when a current of at least one of said direct current sources changes.

5. A monitoring apparatus for a power plant according to claim 3, wherein said first predetermined direction is one of the width direction and the height direction of said corresponding symbol.

6. A monitoring apparatus for a power plant according to claim 4, wherein said first predetermined direction is one of the width direction and the height direction of said corresponding symbol.

7. A monitoring apparatus for a power plant including a plurality of direct current sources, comprising:

means for displaying a predetermined number of symbols representing said direct current sources, each one of said symbols also indicating the polarity of a corresponding one of said direct current sources; and means for changing a displayed conformation of a corresponding symbol in a direction of said polarity when one of a voltage and a current of at least one of said direct current sources changes.

8. A monitoring apparatus for a power plant including a plurality of direct current sources, comprising:

means for displaying a predetermined number of symbols representing said direct current sources, each one of said symbols also indicating the polarity of a corresponding one of said direct current sources; and means for changing a displayed conformation of a corresponding symbol in the direction of said polarity when a voltage of at least one of said direct current sources changes, and for changing a displayed form of a corresponding symbol in a direction different from said polarity direction when a current of at least one of said direct current sources changes.

9. A monitoring apparatus for a power plant including a plurality of generating systems, each of said generating systems being composed of a definite number of direct current sources electrically connected to each other, comprising:

means for displaying a system diagram including a definite number of symbols representing said direct current sources and line symbols representing electrical connections between said direct current sources; and means for changing a displayed conformation of at least one of a corresponding one of said symbols representing said direct current sources and a corresponding one of said line symbols representing electrical connections when at least one physical quantity of a state of at least one of said generating systems changes.

10. A monitoring apparatus for a power plant including a plurality of generating systems, each of said generating systems being composed of a definite number of direct current sources electrically connected to each other, comprising:

means for displaying a system diagram including a definite number of symbols representing said direct current sources and line symbols representing electrical connections between said direct current sources; and means for changing a displayed conformation of a corresponding line symbol when at least one physical quantity of a state of at least one of said direct current sources in one of said generating systems changes, and for changing a displayed form of a corresponding symbol of one of said direct current sources when a physical quantity different from said at least one physical quantity of a state of at least one of said direct current sources in one of said generating systems changes.

11. A monitoring apparatus for a power plant including a plurality of generating systems, each of said generating systems being composed of a definite number of direct current sources electrically connected to each other, comprising:

means for displaying a system diagram including a definite number of symbols representing said direct current sources and line symbols representing electrical connections between said direct current sources; and means for changing a displayed conformation of a corresponding line symbol when a current of at least one of said generating systems changes, and for changing a displayed form of a corresponding symbol of one of said direct current sources when a voltage of said one of said direct current sources changes.

12. A monitoring apparatus for a power plant including a plurality of generating systems, each of said generating systems being composed of a definite number of direct current sources electrically connected to each other, comprising:

means for displaying a system diagram including a definite number of symbols representing said direct current sources and line symbols representing electrical connections between said direct current sources; and means for changing a width of a corresponding line symbol when a current of at least one of said generating systems changes, and for changing a displayed conformation of a corresponding symbol of one of said direct current sources in the direction of connection of said line symbols when a voltage of said one of said direct current sources changes.

13. A monitoring apparatus for a power plant including a plurality of generating systems, each of said generating systems being composed of a definite number of direct current sources electrically connected to each other, comprising:

means for displaying a system diagram including a definite number of symbols representing said direct current sources and line symbols representing electrical connections between said direct current sources, each one of said symbols of said direct current sources also indicating the polarity of a corresponding one of said direct current sources, and said line symbols connecting said symbols of said direct current sources in the direction of said polarity; and means for changing a width of said corresponding line symbol in accordance with a change of a current of at least one of said generating systems, and for changing a displayed conformation of said corresponding symbol of one of said direct current sources in the direction of connection of said line symbols in accordance with a change in a voltage of said one of said direct current sources.

14. A monitoring apparatus for a power plant according to claim 1, wherein information on one of an operation state and an operation history of at least one of said direct current sources is displayed at a neighboring vicinity of the symbol corresponding to said at least one of said direct current sources for which said information is displayed.

15. A monitoring apparatus for a power plant according to claim 14, wherein said information on said operation history is one of a lifetime consumption and a remaining lifetime of each one of said direct current sources.

16. A monitoring apparatus for a power plant including a plurality of generating systems, each of said generating systems being composed of a definite number of direct current sources electrically connected to each other, comprising:

means for displaying a system diagram including a definite number of symbols representing said direct current sources and line symbols representing electrical connections between said direct current sources, on a display screen;

wherein said displaying means further includes means for displaying at least a part of a prepared picture, and for changing said displayed picture to a picture including other generating systems by scrolling said display screen on demand.

17. A plant monitoring apparatus having means for displaying a system diagram of a plant, said system diagram being composed of predetermined symbols corresponding to a plurality of plant components, comprising:

means for displaying a figure of information on predetermined manipulating procedures of components for a plurality of plant components, on the same screen as said system diagram is displayed; and means for changing the manner of displaying said figures of said information on said predetermined manipulating procedures of components, according to operation states and manipulation states of said plant components.

18. A plant monitoring apparatus having means for displaying a systems diagram of a plant on a display screen, said system diagram being composed of predetermined symbols corresponding to a plurality of plant components, comprising:

means for displaying a figure of information on predetermined manipulating procedures of components for a plurality of plant components, on the same figure as said system diagram is displayed; and means for displaying a plant component to be manipulated and a plant component under manipulation in said figure so as to distinguish operation states of said plurality of plant components.

* * * * *